United States Patent [19]

Miyanaga et al.

[11] Patent Number: 4,611,755

[45] Date of Patent: Sep. 16, 1986

[54] AUTOMOBILE AIR CONDITIONER SYSTEM WITH IMPROVED TEMPERATURE CONTROL DEVICE

[75] Inventors: Choshichi Miyanaga, Higashi-Matsuyama; Yoshihiko Sakurai, Konan; Katsumi Iida, Konan; Akihiro Hagiwara, Konan, all of Japan

[73] Assignee: Diesel Kiki Co., Ltd., Tokyo, Japan

[21] Appl. No.: 798,027

[22] Filed: Nov. 14, 1985

[30] Foreign Application Priority Data

Nov. 19, 1984 [JP] Japan .................................. 59-175269

[51] Int. Cl.[4] ............................................ G05D 23/13
[52] U.S. Cl. ........................................ 236/13; 91/361; 318/663
[58] Field of Search .................. 236/13, 78 C; 165/43; 91/361; 318/663

[56] References Cited

U.S. PATENT DOCUMENTS

| | | | |
|---|---|---|---|
| 2,155,984 | 4/1939 | Shivers | 236/78 C X |
| 2,511,846 | 6/1950 | Halpert | 91/361 X |
| 2,844,776 | 7/1958 | Dimeff | 318/663 X |
| 3,320,503 | 5/1967 | Schooley et al. | 318/663 X |
| 3,419,775 | 12/1968 | Kardos | 318/663 X |

Primary Examiner—William E. Tapolcai
Attorney, Agent, or Firm—Wenderoth, Lind & Ponack

[57] ABSTRACT

A temperature control device used in an automobile air conditioner system includes a potentiometer for detecting the opening amount of an air-mix door. The potentiometer is tapped and includes at least one auxiliary resistance connected in parallel with a resistance element of the potentiometer.

2 Claims, 5 Drawing Figures

AUTOMOBILE AIR CONDITIONER SYSTEM WITH IMPROVED TEMPERATURE CONTROL DEVICE

BACKGROUND OF THE INVENTION

1. Field of the Invention

The present invention relates generally to an automobile air conditioner system, and more particularly to such system having a temperature control device for adjusting the opening position of an air-mix door in the air conditioner system to control the temperature of air blown into a vehicle passenger compartment.

2. Prior Art

Japanese Utility Model Laid-open Publication No. 59-75797 discloses one such automobile air conditioner system which comprises, as shown in FIG. 4 of the accompanying drawings, an air-mix door 3 disposed in an air duct 1 immediately upstream of a heater core 2 to proportion the amount of air flow passing through the heater core 2 and the amount of air flow by-passing the heater core 2, thereby controlling the temperature of air which is introduced into a vehicle passenger compartment. Thus, the air temperature t blown-off from the duct 1 is determined in accordance with the opening position or amount 0 of the air-mix door 3. The air-mix door 3 is connected to a drive shaft 6 of a motor actuator 5 via a linkage mechanism 4. The motor actuator 5 includes a motor 8 driven by a control circuit 7 to turn the drive shaft 6 in response to an output signal from the control circuit 7. The motor actuator 5 further includes a potentiometer 9 for detecting the opening amount of the air-mix door 3. The potentiometer 9 includes a movable contact 9a movable in unison with the air-mix door 3, and a resistance element 9b along which the movable contact 9a slides such that the output voltage at the movable contact 9a is a linear function of the displacement of the contact with various sensors such as a temperature setter 10, a compartment air temperature sensor 11, an outside air temperature sensor 12 and a sunlit-portion temperature sensor 13 to receive therefrom input information concerning thermal loads on the air conditionner system. On the basis of the input information, the control circuit then computes a composite signal corresponding to the thermal loads. The composite signal is compared with the signal delivered from the potentiometer 9 and indicative of the opening amount of the air-mix door 3 so as to determine a control signal which is in turn fed back to the motor 8 to control the same.

The blown-off air temperature t of the temperature control system occasionally varies out of linear function of the opening amount $\theta$ of the air-mix door 3. More specifically, as shown in FIG. 5, as the air-mix door 3 approaches its full hot position, the blown-off air temperature t shows an irregular change with respect to an even increase in the opening amount $\theta$ of the air-mix door 3. Occurence of such phenomenon depends upon the structure of the duct 1 or the location of the heater core 2.

If the opening amount $\theta$ of the air-mix door 3 were linearly related to the output voltage of the potentiometer 9, the control circuit 7 would produce output signals to move the air-mix door 3 toward the HOT side for effecting a uniform increase $\Delta\theta_2$ in the opening amount $\theta$, thereby increasing the blown-off air temperature t by the amount $\Delta t_2$. With this arrangement, the desired preset temperature is obtainable when the opening amount $\theta$ of the air-mix door 3 is below a value $\theta_1$. However, when the opening amount $\theta$ exceeds the value $\theta_1$, a change or variation $\Delta t_2'$, becomes greater than the change $\Delta t_2$ and deviates from the present temperature. As a result, confortable air conditioning of the vehicle passenger compatment is difficult to achieve.

SUMMARY OF THE INVENTION

With the foregoing difficulties associated with the prior apparatus in view, an object of the present invention is to provide a temperature control device used in an automobile air conditioner system in which the temperature of air blown into a vehicle passenger compartment is properly adjusted at the desired value, thereby providing vehicle occupants with a pleasant feeding.

According to the present invention, the foregoing and other objects are attained by an automobile air conditioner system including an air-mix door for adjusting the temperature of air blown-off from the air conditioner system, and a temperature control device having a potentiometer including a movable contact movable in unison with said air-mix door and a resistance element along which said movable contact slides for detecting the opening amount of said air-mix door, said temperature control device comprising at least one tap disposed between opposite ends of said resistance element, and an auxiliary resistance connected at its one end with said tap and disposed parallel to said resistance element.

As described above, the auxiliary resistance is connected parallel to one portion of the fixed terminal or tap. With this construction, the output voltage of the potentiometer, which is proportional to the opening amount $\theta$, shows a sharp change at the tap. This change in the output voltage corresponds to a change in the opening amount in the air-mix door.

Many other advantages, features and additional objects of the present invention will become manifest to those versed in the art upon making reference to the detailed description and the accompanying sheets of drawings in which a preferred structural embodiment incorporating the principles of the present invention is ahown by way of illustrative example.

DETAILED DESCRIPTION

Figure 1:
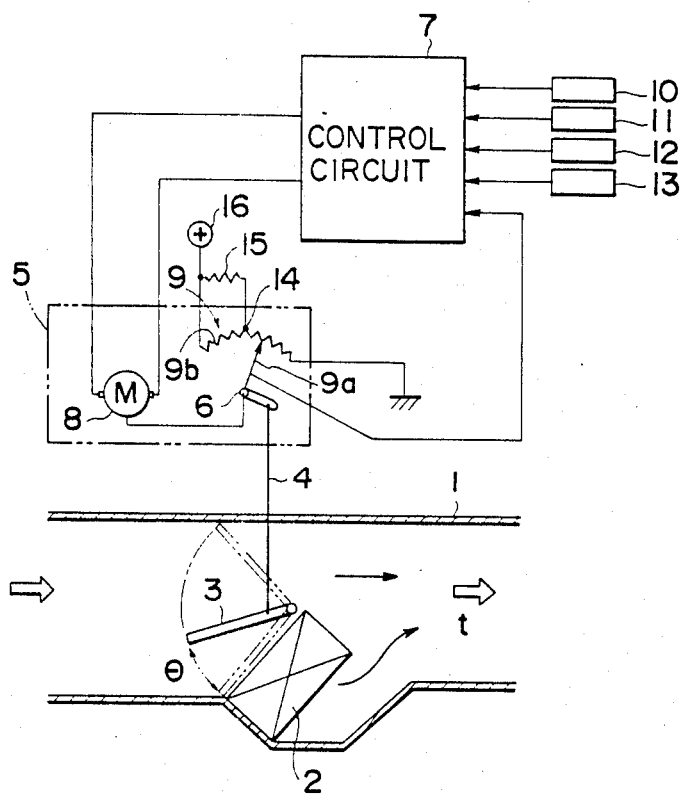
FIG. 1 is diagrammatic view of an automobile air conditioner system having a temperature control device according to the present invention.

The present invention is described in greater detail with respect to an embodiment shown in FIG. 1.

An autmobile air conditioner system comprises an air duct 1 including a heater core 2 disposed therein and an air-mix door 3 disposed immediately upstream of the heater core 2 to adjust the air flow through the heater core 2, thereby the temperature t of air which is blown into a vehicle passenger compartment. The system also includes a temperature control device 5 connected with the air-mix door 3 via a linkage mechanism 4. The control device 5 comprises a motor actuator having an output shaft 6 coupled with the air-mix door 3 for movement in unison therewith. The motor actuator 5 includes a motor 8 controlled by a control circuit 7 to turn the output shaft 6 in response to the output signal delivered from the control circuit 7. The motor actuator 5 further has a potentiometer 9 for detecting the opening position or amount of the air-mix door 3. The control circuit 7 is connected with a temperature setter 10, a compartment air temperature sensor 11, an outside air temperature sensor 12 and a sunlit-portion temperature sensor 13 for receiving respective output signals representing information concerning thermal loads on the air conditioner system. The control circuit 7 computes, on the basis of the input information, a composite signal corresponding to the thermal loads, then determines a control signal by comparing the composite signal with a signal indicative of the opening amount of the air-mix door 3 which is delivered from the potentiometer 9, and finally feeds the control signal back to the motor 8 to control the latter.

The potentiometer 9 includes a movable contact 9a adapted to be moved in unison with the air-mix door 3, and a resistance element 9b along which the movable contact 9a slides such that the output voltage at the contact 9a is proportional to the displacement of the contact 9a. The potentiometer 9 further includes a fixed terminal or tap 14 disposed between opposite ends of the resistance element 9b. An auxiliary resistance 15 is connected at its other end to the anode of a power source 16. Thus, the auxiliary resistance 15 is connected parallel to one of two portions of the resistance element 9b which are separated from one another by the tap 14. The auxiliary resistance 15 is mounted externally of the motor actuator 5. Alternatively, it may be mounted on a circuit board disposed in the motor actuator 5.

Figure 2:
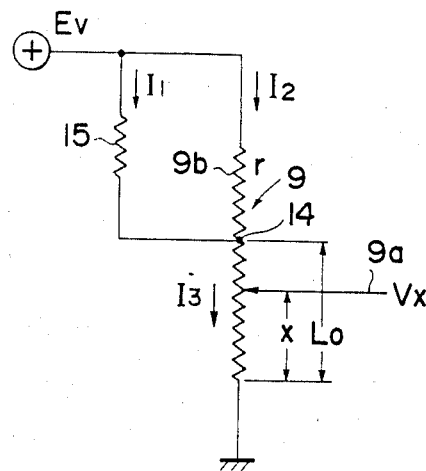
FIG. 2 is a circuit diagram showing the connection of the potentiometer according to the present invention.
Figure 3:
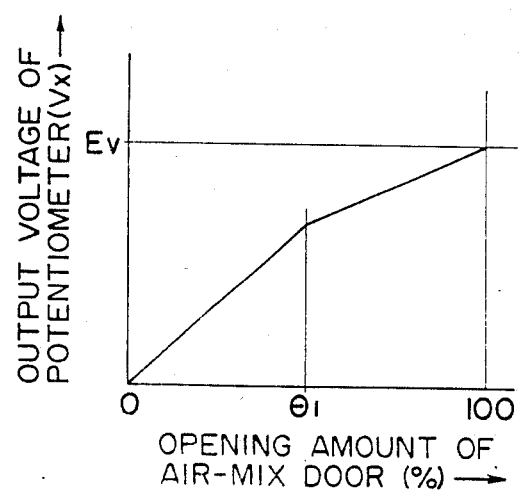
FIG. 3 is a graph showing the output charateristic of the potentiometer.
Figure 4:
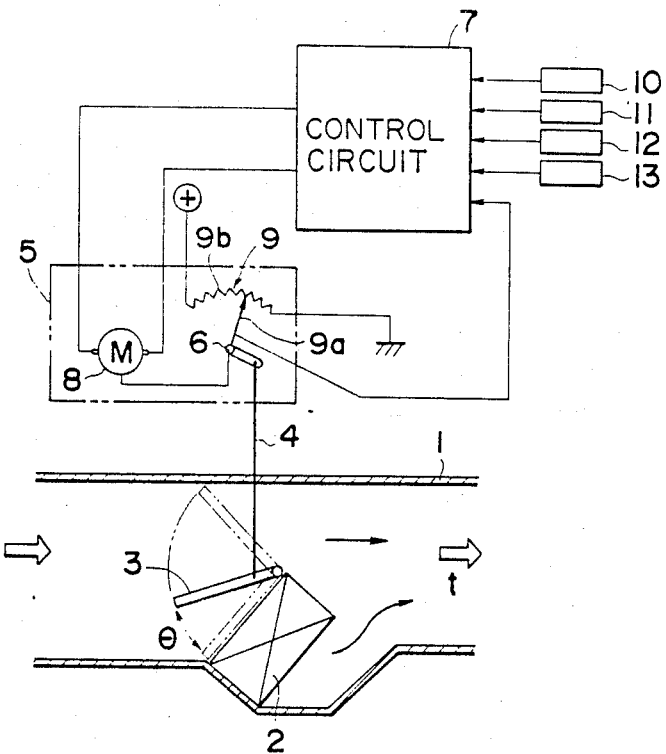
FIG. 4 is a diagramatic view of an automobile air conditioner system having a conventional temperature control device.

The electric circuit diagram of the potentiometer 9 is shown in FIG. 2 wherein $I_1$ representates the current flowing across the auxiliary resistance 15, $I_2$ the current flowing between an upper end of the resistance element 9b and the tap 14, $I_3$ the current flowing between the tap 14 and a lower end of the resistance element 9b, r the resistance per unit length of the resistance element, $L_0$ the distance between the lower end of the resistance element 9b and the tap 14, x the distance between the lower end of the resistance element 9b and the movable contact 9a. With this arrangement, when $x \leq L_0$ the output voltage $V_x$ of the potentiometer 9 is given by the following equation:

$$V_x = r \times I_3 \tag{1}$$

On the other hand, when $x \geq L_0$, the output voltage $V_x$ of the potentiometer 9 is given by the following equation:

$$V_x = rL_0 I_3 + r(x - L_0)I_2$$

Accordingly, $$V_x = r \times I_2 + rL_0(I_3 - I_2) I_3 - I_2 = I_1$$

Therefore, $$V_x \times r \times I_2 + rL_0 I_1 \tag{2}$$

Figure 5:
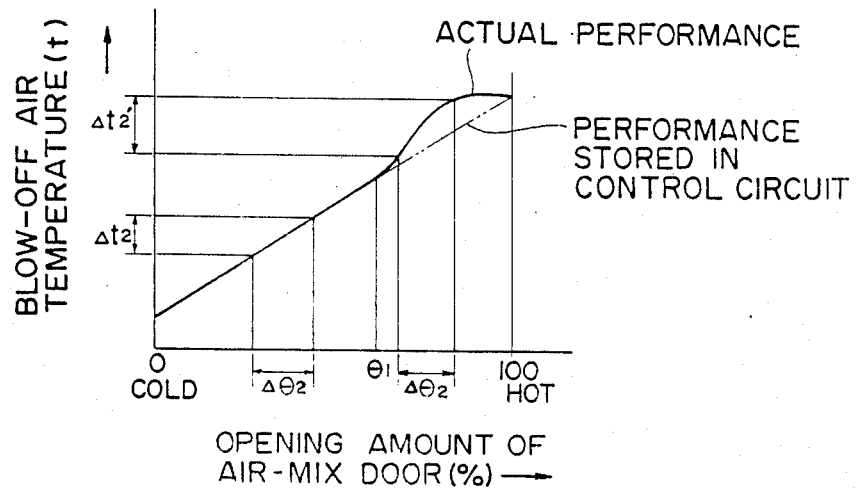
FIG. 5 is a graph showing the blown-off air temperature against the opening amount of an air-mix door.

From the foregoing equations, it appears that when $x = L_0$, the output voltage in both equations is given by $V_x = rL_0 I_3$, and $I_3 > I_2$. Accordingly, by properly setting the currents $I_1$ and $I_2$ which vary with the position of the tap 14 and the resistance value of the auxiliary resistance 14, the relation between the output voltage $V_x$ of the potentiometer 9 and the opening amount $\theta$ of the air-mix door 3 corresponding to the position of the movable contact 9a is given by a performance curve consisting of two linear lines joined at the turning point corresponding to the opening amount $\theta_1$ of the air-mix door 3. Thus, a sharp change in the blown-off air temperature occurring when the air-mix door 3 has the opening amount $\theta_1$ is compensated by the potentiometer 9 which in turn delivers an output signal to the control circuit 7. Such compensation ensures that the blown-off air temperature t varies along the desired performance line indicated by the phantom lines in FIG. 5. The blown-off air temperature t changes an even rate of variation over the entire range of movement of the air-mix door 3 so that a stable temperature change of blown-off air and improves feelings of occupants of the vehicle passenger compartment are provided.

Although in the illustrated embodiment, the auxiliary resistance 15 is connected to the tap 14 fixed to the resistance element 9b at the power source side of the latter, two such taps and auxiliary resistance may be employed in which instance the other end of each auxiliary resistance is grounded. Other modifications are possible to satisfy the desired performance of the potentiometer.

Obviously, many modifications and variations of the present invention are possible in the light of the above teachings. It is therefore to be understood that within the scope of the appended claims, the invention may be practiced otherwise than as specifically described.

What is claimed is:

1. An automobile air conditioner system including an air-mix door for adjusting the temperature of air blown-off from the air conditioner system, and a temperature control device having a potentiometer including a movable contact movable in unison with said air-mix door and a resistance element along which said movable contact slides for detecting the opening amount of said air-mix door, said temperature control device comprising at least one tap disposed between opposite ends of said resistance element, and an auxiliary resistance connected at its one end with said tap and disposed parallel to said resistance element.

2. An automobile air conditioner system according to claim 1, said temperature control device further including a power source, one end of said resistance element and the other end of said auxiliary resistance being connected with an anode of said power source.

* * * * *